United States Patent [19]
Whitney

[11] Patent Number: 5,717,752
[45] Date of Patent: Feb. 10, 1998

[54] DATA ACCESS ARRANGEMENT

[75] Inventor: David Whitney, San Jose, Calif.

[73] Assignee: Siemens Components, Cupertino, Calif.

[21] Appl. No.: 497,581

[22] Filed: Jun. 30, 1995

[51] Int. Cl.$^6$ .................................................. H04M 9/00
[52] U.S. Cl. ........................ 379/399; 379/387; 379/412; 370/359
[58] Field of Search ...................... 379/399, 94, 98, 379/387, 402, 404, 405, 412, 413, 342, 344, 345; 370/359

[56] References Cited

U.S. PATENT DOCUMENTS

| | | | |
|---|---|---|---|
| 4,056,719 | 11/1977 | Waaben | 379/344 X |
| 4,456,991 | 6/1984 | Chea, Jr. et al. | 379/394 X |
| 4,700,380 | 10/1987 | Ahuja | 379/387 X |
| 4,815,126 | 3/1989 | Goode et al. | 379/412 X |
| 5,384,837 | 1/1995 | Fox | 379/413 X |
| 5,548,229 | 8/1996 | Segawa et al. | 326/57 |
| 5,555,293 | 9/1996 | Krause | 379/399 X |
| 5,604,785 | 2/1997 | Pryor et al. | 379/29 X |

*Primary Examiner*—Krista M. Zele
*Assistant Examiner*—Devendra T. Kumar

[57] ABSTRACT

A digital access arrangement, coupled between a data terminal equipment having a transmit line and a receive line and tip and ring lines of a network, having a circuit that provides polarity check, hook/switch control, and data modulation functionality. The circuit includes a controller and six controllable switches, each having a conducting state and a blocking state.

20 Claims, 2 Drawing Sheets

DATA ACCESS ARRANGEMENT

FIELD OF THE INVENTION

The present invention generally relates to a device, known as a "data access arrangement" or "DAA", for coupling a data terminal equipment ("DTE") with tip and ring lines of a public switched telephone network (PSTN). In particular, the present invention relates to a data access arrangement (DAA) with hook/switch control, polarity guard and data modulation functionality.

BACKGROUND OF THE INVENTION

Telephone signals are provided to subscribers through the public switched telephone network ("PSTN" or "the network"). The subscriber portion of the network has two wires known as the "tip" and "ring" wires. These wires carry information being transferred to and from the data terminal equipment (DTE) as well as a ring signal which requests a connection between the data terminal equipment (DTE) and the network (PSTN). The bandwidth of the network (PSTN) is between about 300 Hz to 3.4 KHz. Accordingly, any data terminal equipment (DTE), such as data modems, facsimile machines, (non-cellular) portable telephones, speaker phones, and message answering machines, for example, must be compatible with the network (PSTN) to function properly. To this end, data access arrangements (DAAs) provide an interface to bridge any inconsistencies between the data terminal equipment (DTE) and the network (PSTN).

Moreover, the data terminal equipment (DTE) are typically four wire devices, having separate transmit and receive wire pairs. Accordingly, the data access arrangements (DAAs) must include a duplexing circuit to facilitate a bridge between the two-wire network and the four-wire data terminal equipment (DTE).

Furthermore, the network (PSTN) must be protected from potential damage due, for example, to faulty data terminal equipment (DTE) or inadvertent shorts through the data terminal equipment (DTE) to its power line. Indeed, the United States Federal Communications Commission ("FCC") requires a 1500 volt isolation between the data terminal equipment (DTE) and the public switched telephone network (PSTN). Data access arrangements (DAAs) can use either transformers or optical isolators to provide such electrical isolation.

Some known data access arrangement (DAA) circuits include diode bridges coupled with the tip and ring lines so that either of the lines can transmit or receive data. (See e.g., U.S. Pat. No. 4,056,719 to Waaben, and particularly element 102 of FIG. 4, incorporated herein by reference.) Therefore, these diode bridges are known as "polarity guards". Unfortunately, the diodes of a diode bridge polarity guard have a non-linear characteristic. Moreover, two diode voltage drops (about 1.4 volts, for example) are experienced across the diode bridge.

Data access arrangement (DAA) circuits also require a hook/switch controller for switching the DAA circuit onto and off from the tip and ring lines of the public switched telephone network (PSTN). Finally, data access arrangement (DAA) circuits require a drive transistor for injecting signals transmitted by the data terminal equipment (DTE) onto the tip and ring lines of the public switched telephone network (PSTN), thereby modulating a current between the tip line and the ring line.

Known DAAs typically use discrete circuits to perform each of the polarity guard, hook/switch control, and transmission signal injection functions.

In view of the above requirements, an improved data access arrangement (DAA) having a polarity guard with a linear characteristic and which does not introduce a large 1.4 volt voltage drop is desirable. It would also be advantageous if the data access arrangement (DAA) included a single simplified circuit that provided the polarity guard, hook/switch control, and data modulation functionality. It would also be advantageous if such a single simplified circuit could be integrated on a chip.

SUMMARY OF THE INVENTION

Briefly, the present invention provides a data access arrangement (DAA) with a circuit that provides hook/switch control, polarity guard functionality, and an integral drive transistor. The DAA circuit has six controllable switches, each having a conducting state and a blocking state.

The first controllable switch has a first terminal coupled with the tip line of the network, a second terminal, and a control terminal. The second controllable switch has a first terminal coupled with the ring line of the network, a second terminal, and a control terminal. The third controllable switch has a first terminal coupled with the tip line of the network, a second terminal, and a control terminal, and assumes its conducting state when the first controllable switch is in its conducting state and is conducting a current based on a voltage appearing on the tip line.

The fourth controllable switch has a first terminal coupled with the second terminal of the third controllable switch, a second terminal coupled with the ring line of the network, and a control terminal, and assumes its conducting state when the first controllable switch is in its conducting state and is conducting a current based on the voltage appearing on the tip line. The fifth controllable switch has a first terminal coupled with the ring line of the network, a second terminal, and a control terminal, and assumes its conducting state when the second controllable switch is in its conducting state and is conducting a current based on a voltage appearing on the ring line. The sixth controllable switch has a first terminal coupled with the second terminal of the fifth controllable switch, a second terminal coupled with the tip line of the network, and a control terminal, and assumes its conducting state when the second controllable switch is in its conducting state and is conducting a current based on the voltage appearing on the ring line.

In a preferred embodiment of the present invention, the third controllable switch assumes its conducting state when both the first controllable switch is in its conducting state and conducting current based on a voltage appearing on the tip line, and a representation of a signal transmitted by the data terminal equipment is high, and the fifth controllable switch assumes its conducting state when both the second controllable switch is in its conducting state and is conducting current based on a voltage appearing on the ring line, and a representation of a signal transmitted by the data terminal equipment is high.

Further, the first controllable switch conducts a current when a switching signal is applied to its control input and a voltage is present on the tip line and the second controllable switch conducts a current when a switching signal is applied to its control input and a voltage is present on the ring line. The first controllable switch is preferably a phototransistor, in which case the switching signal applied to its control input is light emitted by a first light emitting diode. The second controllable switch is preferably a phototransistor, in which case the switching signal applied to its control input is light emitted by a second light emitting diode. Also, a single light emitting diode, optically coupleable with the first and second phototransistors, can replace the first and second light emitting diodes. In either case, the light emitting diode(s) may emit light in response to at least one of a ring detected on one of the tip and ring lines, and a request to transmit data by the data terminal equipment.

The third, fourth, fifth and sixth controllable switches are preferably transistors, such as MOSFETs for example.

In an alternative embodiment, the data access arrangement circuit includes a controller having three input terminals and five output terminals, and six controllable switches, each having a conducting state and a blocking state. The controller provides switch close signals on its first and second output terminals when a voltage is applied to its first input terminal, provides switch close signals on its third and fourth output terminals when a voltage is applied to its second input terminal, and electrically couples its third input terminal with its fifth output terminal.

The first controllable switch has a first terminal coupled with the tip line of the network, a second terminal coupled with the first input of the controller, and a control terminal. The second controllable switch has a first terminal coupled with the ring line of the network, a second terminal coupled with the second input of the controller, and a control terminal. The third controllable switch has a first terminal coupled with the tip line of the network, a second terminal coupled with the third input of the controller, and a control terminal coupled with the first output of the controller, and assumes its conducting state when a switch close signal is applied to its control terminal.

The fourth controllable switch has a first terminal coupled with the fifth output terminal of the controller, a second terminal coupled with the ring line of the network, and a control terminal coupled with the second output of the controller, and assumes its conducting state when a switch close signal is applied to its control terminal. The fifth controllable switch has a first terminal coupled with the ring line of the network, a second terminal coupled with the third input of the controller, and a control terminal coupled with the third output of the controller, and assumes its conducting state when a switch close signal is applied to its control terminal. The sixth controllable switch has a first terminal coupled with the fifth output terminal of the controller, a second terminal coupled with the tip line of the network, and a control terminal coupled with the fourth output of the controller, and assumes its conducting state when a switch close signal is applied to its control terminal.

The controller preferably includes a conductor for electrically coupling the third input of the controller with the fifth output of the controller. The conductor is preferably coupled, in an electrically isolated manner, with the receive and transmit lines of the data terminal equipment.

BRIEF DESCRIPTION OF THE DRAWINGS

For a better understanding of the invention, reference is made to the following description of an exemplary embodiment thereof, and to the accompanying drawings, wherein.

DETAILED DESCRIPTION

Figure 1:
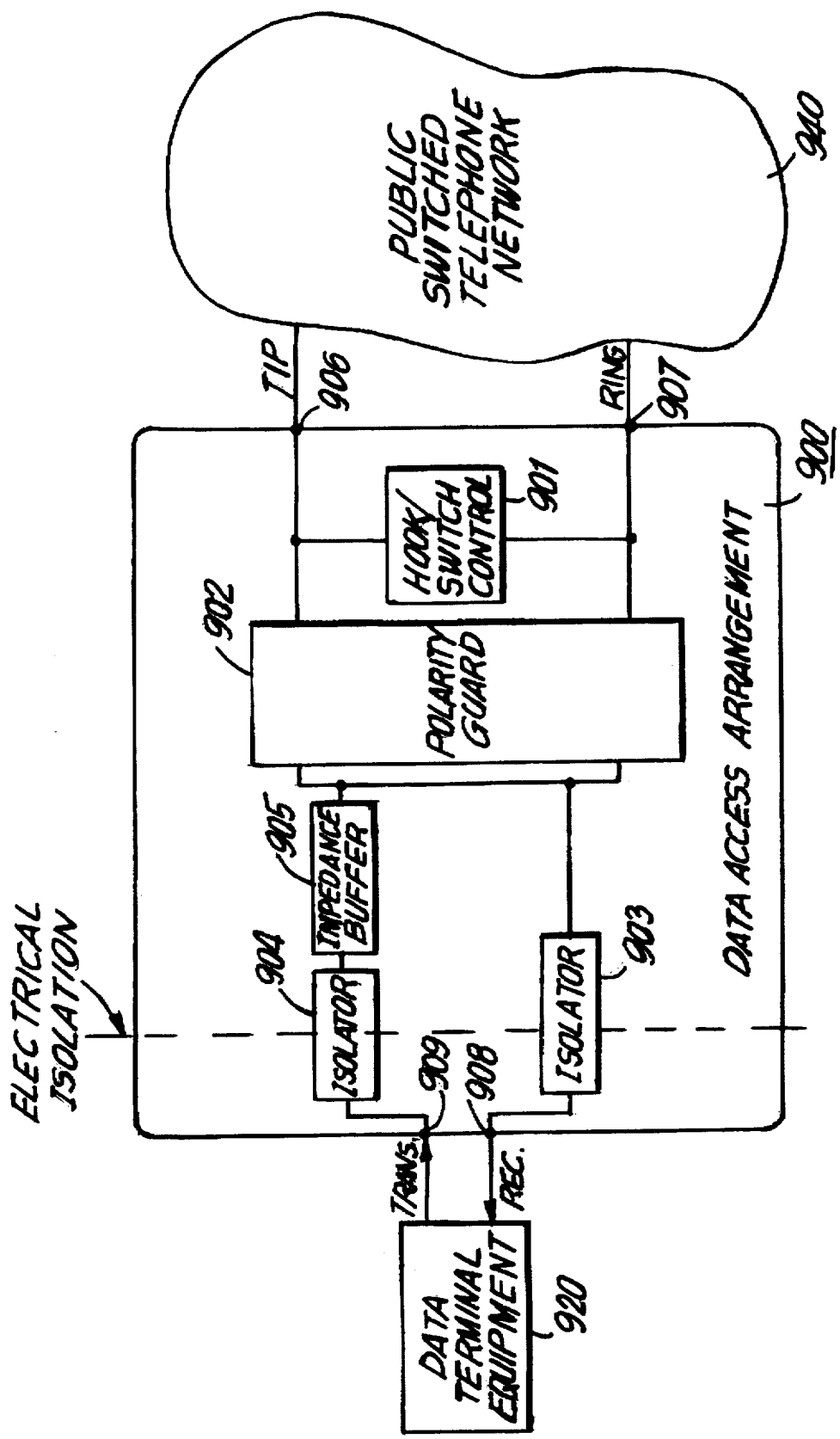
FIG 1 is a block schematic of a data access arrangement.

FIG. 1 is a block diagram of a data access arrangement (DAA) 900 coupled between a data terminal equipment (DTE) 920 and the tip and ring lines of a public switched telephone network (PSTN) 940. As discussed above, the data access arrangement (DAA) 900 facilitates data communication between the data terminal equipment (DTE) 920 and the public switched telephone network (PSTN) 940.

The data access arrangement (DAA) 900 includes a hook/switch controller 901, a polarity guard 902, a first electrically isolating 903 coupler, a second electrically isolating coupler 904, and an impedance buffer 905. The hook switch controller 901 establishes DC continuity when a call is in progress. That is, the hook switch controller 901 establishes an "off hook" circuit. The polarity guard 902 is typically a diode bridge and allows the data access arrangement (DAA) 900 to function properly regardless of the polarity of the voltage across the tip and ring lines of the public switched telephone network (PSTN) 940. The first and second electrically isolating couplers 903 and 904, respectively, electrically isolate the data terminal equipment (DTE)920 from the public switched telephone network (PSTN) 940 while facilitating data transfer. As discussed above, the first and second electrically isolating couplers may employ a transformer, or optical isolators to provide the required electrical isolation. The impedance buffer 905 is used to provide a high input impedance and can be a transistor, for example.

Figure 2:
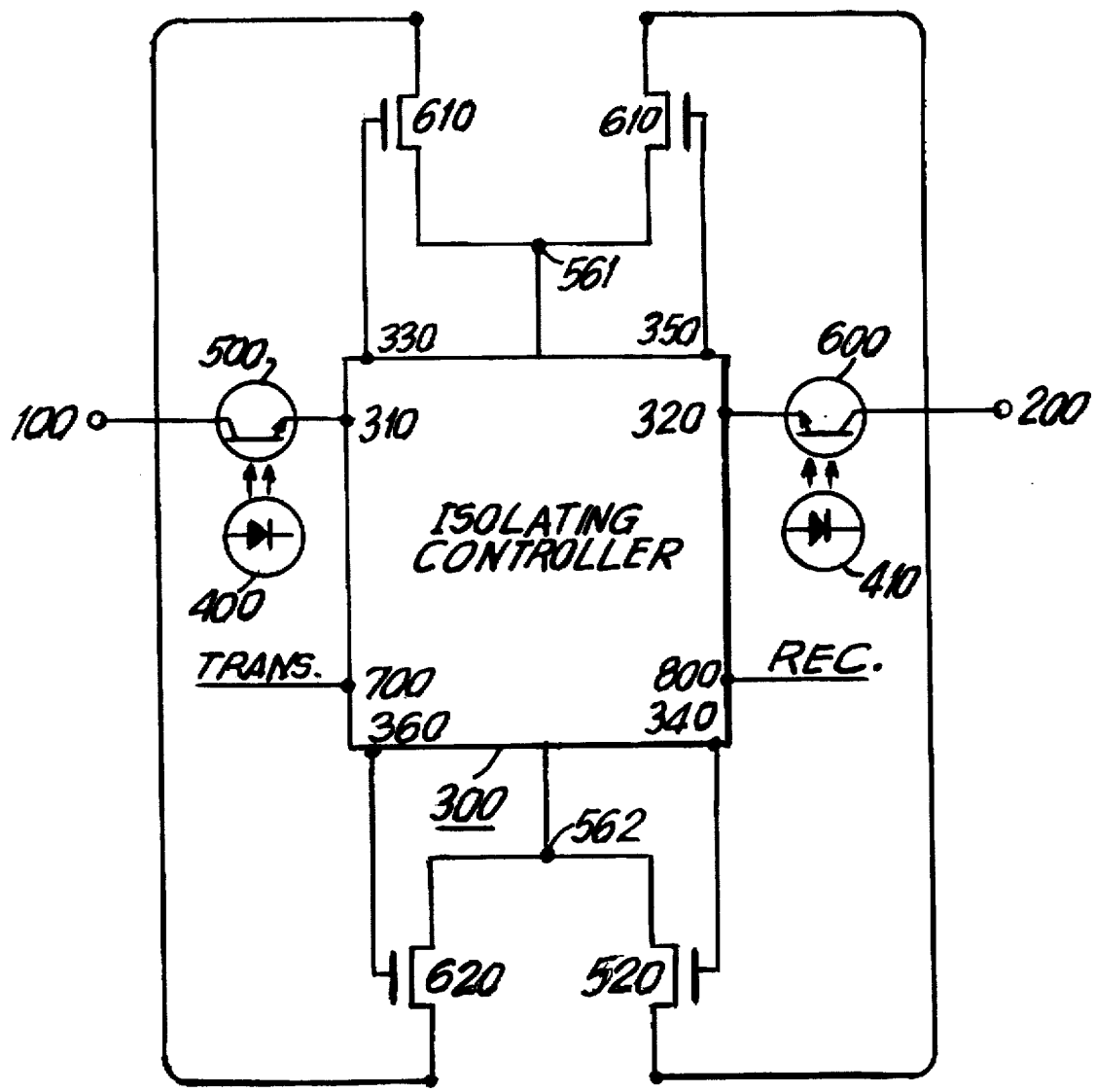
FIG. 2 is a schematic of a data access arrangement (DAA) circuit that provides hook/switch control, polarity guard functionality, and an integral drive transistor.

As shown in FIG. 2, the DAA circuit of the present invention includes an isolating controller 300, a first phototransistor 500, a second phototransistor 600, a first MOSFET 510, a second MOSFET 520, a third MOSFET 610 and a fourth MOSFET 620.

The first phototransistor 500 is optically coupleable with a first LED 400. The first LED 400 emits light when the data access arrangement (DAA) is to be off-hook, i.e., when the data access arrangement (DAA) is to be connected to the local telephone network. The data access arrangement (DAA) is to be off-hook for example, if a ring signal is detected on the tip or ring lines or if the data terminal equipment (DTE) requests connection to the network (PSTN) for transmitting data. Similarly, the second phototransistor 600 is optically coupleable with a second LED 410. The second LED 410 emits light when the DAA is to be off-hook. In an alternative embodiment, the first and second LEDs 400 and 410, respectively, can be replaced with a single LED which is optically coupleable with both the first phototransistor 500 and the second phototransistor 600.

The collector of the first phototransistor 500 is coupled with the tip line 100 of the public switched telephone network (PSTN) and the source of the first MOSFET 510, while the collector of the second phototransistor 600 is coupled with the ring line 200 of the public switched telephone network (PSTN) and the source of the third MOSFET 610. The emitter of the first phototransistor 500 is coupled with a first input terminal 310 of the isolating controller 300 while the emitter of the second phototransistor 600 is coupled with a second input terminal 320 of the isolating controller 300.

A first output 330 of the isolating controller 300 is coupled to the gate of the first MOSFET 510 and a second output 340 of the isolated controller 300 is coupled with the gate of the second MOSFET 520. The first and second outputs 330 and 340, respectively, provide a high signal when a voltage is applied to the first input 310. In an alternative embodiment, a single output can replace the first and second outputs 330 and 340, respectively, because the first and second outputs 330 and 340, respectively, always provide the same signal.

Similarly, a third output 350 of the isolating controller 300 is coupled with the gate of the third MOSFET 610 and the fourth output 360 of the isolating controller 300 is coupled with the gate of the fourth MOSFET 620. The third and fourth outputs 350 and 360, respectively, provide a high signal when a voltage is applied to the second input 320. In an alternative embodiment, a single output can replace the third and fourth outputs 350 and 360, respectively, because the third and fourth outputs 350 and 360, respectively, will always provide the same signal.

The drains of the first and third MOSFETs 510 and 610, respectively, are coupled together at a first node 561. The sources of the second and fourth MOSFETs 520 and 620, respectively, are coupled together at a second node 562. The first node 561 is electrically coupled with the second node 562 via the control block isolator 300.

Within the isolating controller 300, a first electrical isolator (not shown), such as a transformer or linear optocoupler for example, electrically isolates the tip and ring lines from the transmit terminal 700 of the data access arrangement the isolating co, also within the isolating controller 300, a second electrical isolator (not shown), such as a transformer or linear optocoupler for example, electrically isolates the tip and ring lines from the receive terminal 800 of the data access arrangement (DAA).

In operation, when the data access arrangement (DAA) wants to go "off hook", i.e., when the data access arrangement (DAA) wants to permit communication between the data terminal equipment (DTE) and the public switched telephone network (PSTN), the first and second LEDs 400 and 410 are made to emit light. This can be in response to the detection of a ring signal on either the tip line or the ring line, or to a connection request from the data terminal equipment (DTE) for transmitting data.

If the ring terminal 200 is supplied with a positive voltage, this voltage is applied to the collector of the second phototransistor 600 and also to the source of the third MOSFET 610. The light emitted by the second LED 410 causes the second phototransistor 600 to conduct any current due to the voltage from its collector to its emitter (i.e., the second phototransistor is closed). Since a voltage is applied to the second input 320 of the isolating controller 300, a high signal is provided at the third and fourth output terminals 350 and 360, respectively, of the isolating controller 300. Since these high signals are applied to the gates of the third and fourth MOSFETs 610 and 620, respectively, these MOSFETs conduct (i.e., are closed). The voltage applied at the source of the third MOSFET 610 causes a current to flow to the first node 561, which is coupled, via the control block isolator 300 to the second node 562. The second isolator (not shown) provides a representation of the current caused by the voltage drop, to the receive terminal 800. From the second node 562, the current flows from the source to the drain of the fourth MOSFET 620, and thus, to the tip terminal 100.

Thus, by closing the third and fourth MOSFETs, 610 and 620, respectively, while the first and second MOSFETs, 510 and 520, respectively, remain open, the circuit functions as a polarity guard. The second LED 410 and the second phototransistor 600 switch the data access arrangement (DAA) circuit to and from the public switched telephone network (PSTN) while the first and second isolators (not shown, which may be a transformer or optocoupler, for example) of the control block isolator 300 electrically isolate the data terminal equipment (DTE) coupled with the DAA, from the public switched telephone network (PSTN).

Furthermore, the gate of the third MOSFET 610 can be modulated with a representation of a transmit signal from data terminal equipment (DTE), provided by the first isolator. For example, the third output 350 and the representation of the transmit signal could be applied to two inputs of an AND gate having an output coupled with the gate of the third MOSFET 610. In this way, the same transistor providing hook/switch control and facilitating polarity guard functionality, can also be used to inject a transmit signal onto the network (PSTN). Moreover, the second phototransistor 600 will only sink a nominal voltage (as compared with 1.2 Volts sunk by the diode bridge polarity guard) and has a linear characteristic.

If the tip terminal 100 is supplied with a positive voltage, this voltage is applied to the collector of the first phototransistor 500 and also to the source of the first MOSFET 510. The light emitted by the first LED 400 causes the first phototransistor 500 to conduct any current due to the voltage from its collector to its emitter (i.e., the first phototransistor is closed). Since a high input is applied to the first input 310 of the isolating controller 300, a high signal is provided at the first and second output terminals 330 and 340, respectively, of the isolating controller 300. Since these high signals are applied to the gates of the first and second MOSFETs 510 and 520, respectively, these MOSFETs conduct (i.e., are closed). The voltage applied at the source of the first MOSFET 510 causes a current to flow to the first node 561, which is coupled, via the logic control block 300, to the second node 562. The second isolator provides a representation of the current caused by the voltage drop to the receive terminal 800. The current at the second node 562 flows from the source to the drain of the second MOSFET 520, and thus, to the ring terminal 200.

Thus, by closing the first and second MOSFETs, 510 and 520, respectively, while the third and fourth MOSFETs, 610 and 620, respectively, remain open, the circuit functions as a polarity guard. The first LED 400 and the first phototransistor 500 switch the DAA circuit to and from the local telephone network while the transformers or optocouplers of the isolating controller 300 electrically isolate a data terminal equipment (DTE) coupled with the DAA, from the network (PSTN). Furthermore, the gate of the first MOSFET 510 can be modulated with a representation of a transmit signal from data terminal equipment (DTE), provided by the first isolator. For example, the first output 330 and the representation of the transmit signal could be applied to two inputs of an AND gate having an output coupled with the gate of the first MOSFET 510. In this way, the same transistor providing hook/switch control and facilitating polarity guard functionality, can also be used to inject a transmit signal onto the network (PSTN). Moreover, the first phototransistor 500 will only sink a nominal voltage (as compared with 1.2 Volts sunk by the diode bridge polarity guard) and has a linear characteristic.

The embodiments described herein are merely illustrative of the principles of the present invention. Various modifications may be made thereto by persons ordinarily skilled in the art, without departing from the scope or spirit of the invention.

What is claimed is:

1. In a digital access arrangement coupled between a data terminal equipment and tip and ring lines of a network, a circuit, comprising:
   (a) a first controllable switch, the first controllable switch having a first terminal coupled with the tip line of the network, a second terminal, and a control terminal, the first controllable switch having a conducting state and a blocking state;

(b) a second controllable switch, the second controllable switch having a first terminal coupled with the ring line of the network, a second terminal, and a control terminal, the second controllable switch having a conducting state and a blocking state;

(c) a third controllable switch, the third controllable switch having a first terminal coupled with the tip line of the network, a second terminal, and a control terminal, the third controllable switch having a conducting state and a blocking state, wherein the third controllable switch assumes its conducting state when the first controllable switch is in its conducting state and is conducting a current based on a voltage appearing on the tip line;

(d) a fourth controllable switch, the fourth controllable switch having a first terminal coupled with the second terminal of the third controllable switch, a second terminal coupled with the ring line of the network, and a control terminal, the fourth controllable switching having a conducting state and a blocking state, wherein the fourth controllable switch assumes its conducting state when the first controllable switch is in its conducting state and is conducting a current based on the voltage appearing on the tip line;

(e) a fifth controllable switch, the fifth controllable switch having a first terminal coupled with the ring line of the network, a second terminal, and a control terminal, the fifth controllable switch having a conducting state and a blocking state, wherein the fifth controllable switch assumes its conducting state when the second controllable switch is in its conducting state and is conducting a current based on a voltage appearing on the ring line; and (f) a sixth controllable switch, the sixth controllable switch having a first terminal coupled with the second terminal of the fifth controllable switch, a second terminal coupled with the tip line of the network, and a control terminal, the sixth controllable switch having a conducting state and a blocking state, wherein the sixth controllable switch assumes its conducting state when the second controllable switch is in its conducting state and is conducting a current based on the voltage appearing on the ring line.

2. The circuit of claim 1, wherein the third, fourth, fifth and sixth controllable switches are transistors.

3. The circuit of claim 1, wherein the third, fourth, fifth, and sixth controllable switches are MOSFETs.

4. The circuit of claim 1, wherein the third controllable switch assumes its conducting state when both the first controllable switch is in its conducting state and conducting current based on a voltage appearing on the tip line and when a representation of a signal transmitted by the data terminal equipment is high, and wherein the fifth controllable switch assumes its conducting state when both the second controllable switch is in its conducting state and is conducting current based on a voltage appearing on the ring line and when a representation of a signal transmitted by the data terminal equipment is high.

5. The circuit of claim 1, wherein the first controllable switch conducts a current when a switching signal is applied to its control input and a voltage is present on the tip line and the second controllable switch conducts a current when a switching signal is applied to its control input and a voltage is present on the ring line.

6. The circuit of claim 5, wherein the first controllable switch is a phototransistor and the switching signal applied to its control input is light emitted by a first light emitting diode and wherein the second controllable switch is a phototransistor and the switching signal applied to its control input is light emitted by a second light emitting diode.

7. The circuit of claim 6, wherein the first and second light emitting diodes emit light in response to at least one of a ring detected on one of the tip and ring lines, and a request to transmit data by the data terminal equipment.

8. The circuit of claim 5, wherein the first controllable switch is a phototransistor and the switching signal applied to its control input is light emitted by a light emitting diode and wherein the second controllable switch is a phototransistor and the switching signal applied to its control input is light emitted by the light emitting diode.

9. The circuit of claim 8, wherein the light emitting diode emits light in response to at least one of a ring detected on one of the tip and ring lines, and a request to transmit data by the data terminal equipment.

10. In a digital access arrangement coupled between a data terminal equipment having a transmit line and a receive line, and tip and ring lines of a network, a circuit, comprising:

(a) a controller having a first input terminal, a second input terminal, a third input terminal, a first output terminal, a second output terminal, a third output terminal, a fourth output terminal, and a fifth output terminal, the controller providing switch close signals on the first and second output terminals when a voltage is applied to the first input terminal, the controller providing switch close signals on the third and fourth output terminals when a voltage is applied to the second input terminal, and the controller electrically coupling its third input terminal with its fifth output terminal;

(b) a first controllable switch, the first controllable switch having a first terminal coupled with the tip line of the network, a second terminal coupled with the first input of the controller, and a control terminal, the first controllable switch having a conducting state and a blocking state;

(c) a second controllable switch, the second controllable switch having a first terminal coupled with the ring line of the network, a second terminal coupled with the second input of the controller, and a control terminal, the second controllable switch having a conducting state and a blocking state;

(d) a third controllable switch, the third controllable switch having a first terminal coupled with the tip line of the network, a second terminal coupled with the third input of the controller, and a control terminal coupled with the first output of the controller, the third controllable switch having a conducting state and a blocking state, and assuming its conducting state when a switch close signal is applied to its control terminal;

(e) a fourth controllable switch, the fourth controllable switch having a first terminal coupled with the fifth output terminal of the controller, a second terminal coupled with the ring line of the network, and a control terminal coupled with the second output of the controller, the fourth controllable switching having a conducting state and a blocking state, and assuming its conducting state when a switch close signal is applied to its control terminal;

(f) a fifth controllable switch, the fifth controllable switch having a first terminal coupled with the ring line of the network, a second terminal coupled with the third input of the controller, and a control terminal coupled with the third output of the controller, the fifth controllable switch having a conducting state and a blocking state, and assuming its conducting state when a switch close signal is applied to its control terminal; and (g) a sixth controllable switch, the sixth controllable switch having a first terminal coupled with the fifth output terminal of the controller, a second terminal coupled with the tip line of the network, and a control terminal coupled with the fourth output of the controller, the sixth controllable switch having a conducting state and a blocking state, and assuming its conducting state when a switch close signal is applied to its control terminal.

11. The circuit of claim 10, wherein the third, fourth, fifth and sixth controllable switches are transistors.

12. The circuit of claim 10, wherein the third, fourth, fifth, and sixth controllable switches are MOSFETs.

13. The circuit of claim 10, eherein the third controllable switch assumes its conducting state when both a switch close signal is provided to its control terminal and a representation of a signal transmitted by the data terminal equipment is high, and wherein the fifth controllable switch assumes its conducting state when both a switch close signal is provided to its control terminal and a representation of a signal transmitted by the data terminal equipment is high.

14. The circuit of claim 10, wherein controller includes a conductor for electrically coupling the third input of the controller with the fifth output of the controller.

15. The circuit of claim 14, wherein the conductor is coupled, in an electrically isolated manner, with the receive and transmit lines of the data terminal equipment.

16. The circuit of claim 10, wherein the first controllable switch conducts, thereby supplying a voltage to the first input of the controller, when a signal is applied to its control input and a voltage is present on the tip line and the second controllable switch conducts, thereby supplying a voltage to the second input of the controller, when a signal is applied to its control input and a voltage is present on the ring line.

17. The circuit of claim 16, wherein the first controllable switch is a phototransistor and the signal applied to its control input is light emitted by a first light emitting diode and wherein the second controllable switch is a phototransistor and the signal applied to its control input is light emitted by a second light emitting diode.

18. The circuit of claim 17, wherein the first and second light emitting diodes emit light in response to at least one of a ring detected on one of the tip and ring lines, and a request to transmit data by the data terminal equipment.

19. The circuit of claim 16, wherein the first controllable switch is a phototransistor and the signal applied to its control input is light emitted by a light emitting diode and wherein the second controllable switch is a phototransistor and the signal applied to its control input is light emitted by the light emitting diode.

20. The circuit of claim 19, wherein the light emitting diode emits light in response to at least one of a ring detected on one of the tip and ring lines, and a request to transmit data by the data terminal equipment.

* * * * *